United States Patent
Loga

(10) Patent No.: US 7,104,521 B2
(45) Date of Patent: Sep. 12, 2006

(54) DUAL CHAMBER ORIFICE FITTING VALVE

(75) Inventor: Thomas Henry Loga, Houston, TX (US)

(73) Assignee: Daniel Industries, Inc., Houston, TX (US)

( * ) Notice: Subject to any disclaimer, the term of this patent is extended or adjusted under 35 U.S.C. 154(b) by 241 days.

(21) Appl. No.: 10/848,978

(22) Filed: May 19, 2004

(65) Prior Publication Data

US 2005/0258388 A1    Nov. 24, 2005

(51) Int. Cl.
*F16K 5/10* (2006.01)
*F15D 1/02* (2006.01)

(52) U.S. Cl. ............... 251/207; 251/209; 251/309; 138/44

(58) Field of Classification Search ........... 251/207, 251/208, 209, 309; 138/40, 44, 45
See application file for complete search history.

(56) References Cited

U.S. PATENT DOCUMENTS

| | | | |
|---|---|---|---|
| 1,058,092 A | | 4/1913 | Pew et al. |
| 1,698,314 A | | 1/1929 | Mapelsden |
| 1,996,192 A | | 4/1935 | Daniel |
| 2,127,501 A | | 8/1938 | Dall |
| 2,217,216 A | | 10/1940 | Davis |
| 2,306,940 A | | 12/1942 | Fischer |
| 2,621,012 A | * | 12/1952 | Graham ............ 251/207 |
| 2,626,820 A | | 1/1953 | Dons et al. |
| 2,942,465 A | | 6/1960 | Carbone |
| 3,134,405 A | * | 5/1964 | White et al. ......... 251/207 |
| 3,381,532 A | | 5/1968 | Tausch |
| 3,822,592 A | | 7/1974 | Siegel et al. |
| 4,014,366 A | * | 3/1977 | Critendon ........... 138/44 |
| 4,130,128 A | * | 12/1978 | Kaneko ............. 251/207 |
| 4,191,216 A | | 3/1980 | Connolly |
| 4,307,745 A | | 12/1981 | McGee |
| 4,444,224 A | | 4/1984 | Geisow |
| 4,478,251 A | | 10/1984 | Sanchez et al. |
| 4,633,911 A | | 1/1987 | Lohn |
| 4,655,078 A | * | 4/1987 | Johnson ............ 251/207 |
| 4,682,757 A | | 7/1987 | Shelton |
| 4,750,370 A | | 6/1988 | Ossyra |
| 5,069,252 A | | 12/1991 | Kendrick et al. |
| 5,085,250 A | | 2/1992 | Kendrick |
| 5,181,542 A | | 1/1993 | Wass et al. |
| 5,305,796 A | | 4/1994 | Klak |
| 5,305,986 A | * | 4/1994 | Hunt .............. 251/207 |

(Continued)

OTHER PUBLICATIONS

FMC Measurement Solutions; FMC Energy Systems; Bulletin POR0001.00 Issue/Rev. 0.0 (7.01); (10 pp.).

*Primary Examiner*—John Bastianelli
(74) *Attorney, Agent, or Firm*—Conley Rose, P.C.

(57) ABSTRACT

Apparatus and methods for operating a valve assembly for a dual chamber orifice fitting. The dual chamber orifice fitting comprises a body attached to a top. A passageway connects between the body and the top and allows an orifice plate carrier to move between the body and the top. A valve assembly selectably closes the passageway. Embodiments of the valve assembly comprise a seat, a plug, and a stem. The valve assembly has a closed position, wherein a curved outer surface of the plug sealingly engages a curved sealing surface of the seat and prohibits fluid communication through the passageway. The valve assembly has an open position, wherein a plug aperture is aligned with a seat aperture to allow the orifice plate carrier to move through the passageway.

27 Claims, 10 Drawing Sheets

U.S. PATENT DOCUMENTS

| | | |
|---|---|---|
| 5,318,073 A | 6/1994 | Kendrick et al. |
| 5,474,103 A | 12/1995 | Klak |
| 5,706,852 A * | 1/1998 | Deville ............... 251/206 |
| 5,836,356 A | 11/1998 | Desai |
| 5,944,051 A * | 8/1999 | Johnson ............... 251/207 |
| 5,967,166 A | 10/1999 | Carter |
| 6,164,142 A | 12/2000 | Dimeff |
| 6,324,917 B1 | 12/2001 | Mack et al. |
| 6,467,504 B1 | 10/2002 | Bonicontro |
| 6,779,779 B1 * | 8/2004 | Lemmonier et al. ......... 251/207 |

* cited by examiner

DUAL CHAMBER ORIFICE FITTING VALVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to methods and apparatus for monitoring characteristics of a flow stream in a pipeline, in particular to dual chamber orifice fittings. More precisely, the embodiments of the invention relate to an improved valve design for a dual chamber orifice fitting.

In pipeline operations and other industrial applications, flow meters are used to measure the volumetric flow rate of a gaseous or liquid flow stream moving through a piping section. Flow meters are available in many different forms. One common flow meter is an orifice meter, which includes an orifice fitting connected to the piping section. The orifice fitting serves to orient and support an orifice plate that extends across the piping section perpendicular to the direction of flow stream. The orifice plate is a thin plate that includes a circular opening, or orifice, that is positioned within the flow stream.

In operation, when the flow stream moving through the piping section reaches the orifice plate, the flow is forced through the orifice, thereby constricting the cross-sectional area of the flow. Due to the principles of continuity and conservation of energy, the velocity of the flow increases as the stream moves through the orifice. This velocity increase creates a pressure differential across the orifice plate. The measured differential pressure across the orifice plate can be used to calculate the volumetric flow rate of the flow stream moving through the piping section.

A dual chamber orifice fitting embodies a special design that enables the orifice plate to be removed from the fitting without interrupting the flow stream moving through the piping section. This specially designed fitting has been known in the art for many years. U.S. Pat. No. 1,996,192, hereby incorporated herein by reference for all purposes, was issued in 1934 and describes an early dual chamber orifice fitting. Fittings with substantially the same design are still in use in many industrial applications today. Although the design has remained substantially unchanged, operating conditions continue to expand and dual chamber fittings are now available for a wide range of piping sizes and working pressures.

A common dual chamber orifice fitting 12 is illustrated in FIG. 1. Orifice fitting 12 includes body 16 and top 18. Body 16 encloses lower chamber 20 which is in fluid communication with the interior 34 of a pipeline. Top 18 encloses upper chamber 22 and is connected to body 16 by bolts 17. Aperture 30 defines an opening connecting upper chamber 22 to lower chamber 20. Valve seat 24 is connected to top 18 and provides a sealing engagement with slide valve plate 56, which is slidably actuated by rotating gear shaft 54. Lower drive 36 and upper drive 38 operate to move orifice plate carrier 32 vertically within fitting 12.

Orifice plate carrier 32 is shown in a metering position in alignment with bore 34. To remove orifice plate carrier 32 from fitting 12 the following steps are used. First, gear shaft 54 is rotated to slide valve plate 56 laterally and away from valve seat 24 and open aperture 30. Once aperture 30 is opened, lower drive 36 is actuated to move orifice plate carrier 32 upwards into upper chamber 22. Once orifice plate carrier 32 is entirely within upper chamber 22, aperture 30 is closed to isolate the upper chamber from bore 34 and lower chamber 20. Any pressure within upper chamber 20 can then be relieved and orifice plate carrier 32 can be removed from fitting 12 by loosening clamping bar screws 46 and removing clamping bar 44 and sealing bar 40 from top 18.

The slide valve arrangement, as shown in FIG. 1, includes valve seat 24, slide valve plate 56, and gear shaft 54. To open aperture 30, slide valve plate 56 must be moved laterally a sufficient distance to allow orifice plate carrier 32 through the aperture. Lower chamber 20 must be able to accommodate this lateral movement. Gear shaft 54 may also require several full rotations to fully move slide valve plate 56 to and from its sealed position.

Valve designs that are more compact and require less movement for actuation potentially provide advantages both in reduced operating envelope requirements and in simplification of operation. Thus, the embodiments of the present invention are directed to valve apparatus for dual chamber orifice fittings that seek to overcome these and other limitations of the prior art.

SUMMARY OF THE PREFERRED EMBODIMENTS

A valve assembly for a dual chamber orifice fitting comprising a body attached to a top. A passageway connects between the body and the top and allows an orifice plate carrier to move between the body and the top. A valve assembly selectably closes the passageway. Embodiments of the valve assembly comprise a seat, a plug, and a stem. The valve assembly has a closed position, wherein a curved outer surface of the plug sealingly engages a curved sealing surface of the seat and prohibits fluid communication through the passageway. The valve assembly has an open position, wherein a plug aperture is aligned with a seat aperture to allow the orifice plate carrier to move through the passageway.

In certain embodiments, a valve assembly for a dual chamber orifice fitting comprises a seat having a seat aperture and a curved sealing surface and a plug having a plug aperture and curved outer surface. A stem is coupled to an end of the plug and adapted to rotate the plug between a closed position, wherein the curved outer surface of the plug is sealingly engage with the curved sealing surface of the seat, and an open position, wherein the plug aperture is aligned with the seat aperture. In the closed position the plug is adapted to move relative to the stem. In selected embodiments the plug includes one or more equalizer ports connecting the plug aperture to the curved outer surface of the plug. The plug has a equalized position where the plug aperture is not aligned with the seat aperture and fluid communication across the plug is permitted through the equalizer port.

In an alternative embodiment, a dual chamber orifice fitting comprises a body having a lower chamber in fluid communication with a pipeline and a top attached to the body, wherein the top has an upper chamber. A passageway between the upper and lower chambers allows an orifice plate carrier to be moveably disposable through the passageway between the upper chamber and the lower chamber. The fitting also comprises a valve seat having a seat aperture that is substantially aligned with the passageway. A rotatable plug, having a plug aperture therethrough, has a cylindrical outer surface operable to sealingly engage the valve seat when the rotatable plug is in a closed position. A stem is connected to the plug and operable to rotate the plug from the closed position to an open position wherein the plug aperture is aligned with the seat aperture and the passageway. The orifice plate carrier can move through the passageway when the rotatable plug is in the open position. The rotatable plug may have an equalized position wherein the plug aperture is not aligned with the seat aperture and fluid communication through the passageway is permitted through the equalizer port. The rotatable plug is rotated approximately 15 degrees between the closed position and the equalized position and rotated approximately 90 degrees between the closed position and the open position.

In another alternative embodiment, a method for operating a dual chamber orifice fitting comprises rotating a valve assembly from a first position isolating a first chamber of the fitting from a second chamber of the fitting to a second position to expose a first aperture allowing fluid communication between the chambers, allowing fluid flow between the chambers, and rotating the valve assembly to an third position to place a second aperture in fluid communication with the first and second chambers. Then a drive mechanism is actuated to move an orifice fitting plate between the chambers by passing through the second aperture and the valve assembly is rotated back to the first position. In certain embodiments the valve assembly comprises a valve seat attached to the fitting, a plug adapted to engage the valve seat, a stem adapted to rotate the plug, wherein the plug is adapted to move relative to the stem and a bonnet attached to the fitting and supporting the stem. The bonnet engages a slot on the stem as the valve assembly is moved from the first position to the second position and the pin is removed from the slot before rotating the valve assembly to the third position.

Thus, the embodiments of present invention comprise a combination of features and advantages that enable substantial enhancement of the operation of dual chamber orifice fittings. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the present invention, reference is made to the accompanying Figures, wherein.

DETAILED DESCRIPTION OF THE PREFERRED EMBODIMENTS

Figure 1:
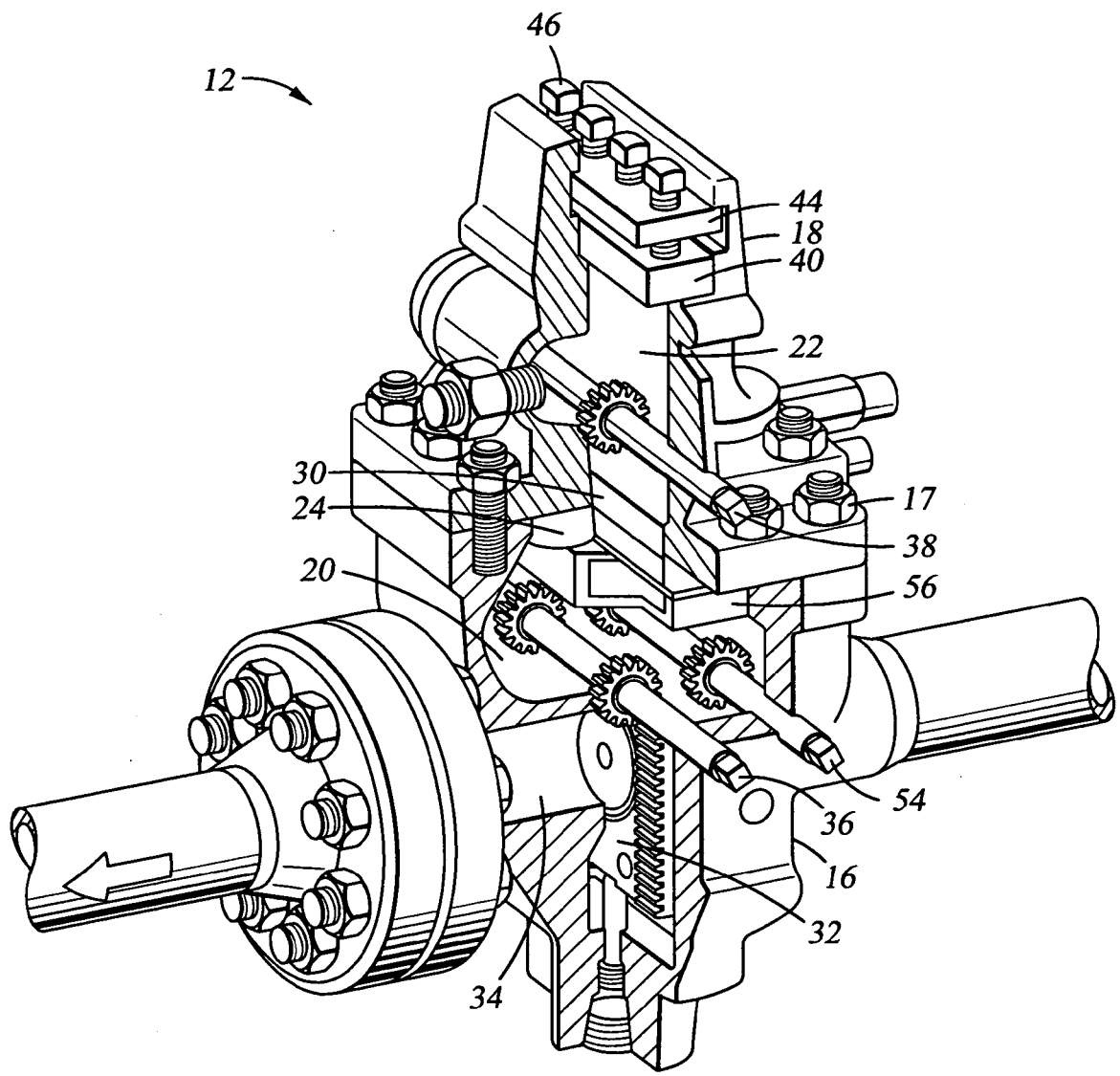
FIG. 1 is a partial sectional isometric view of a prior art dual chamber orifice fitting.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Figure 2:
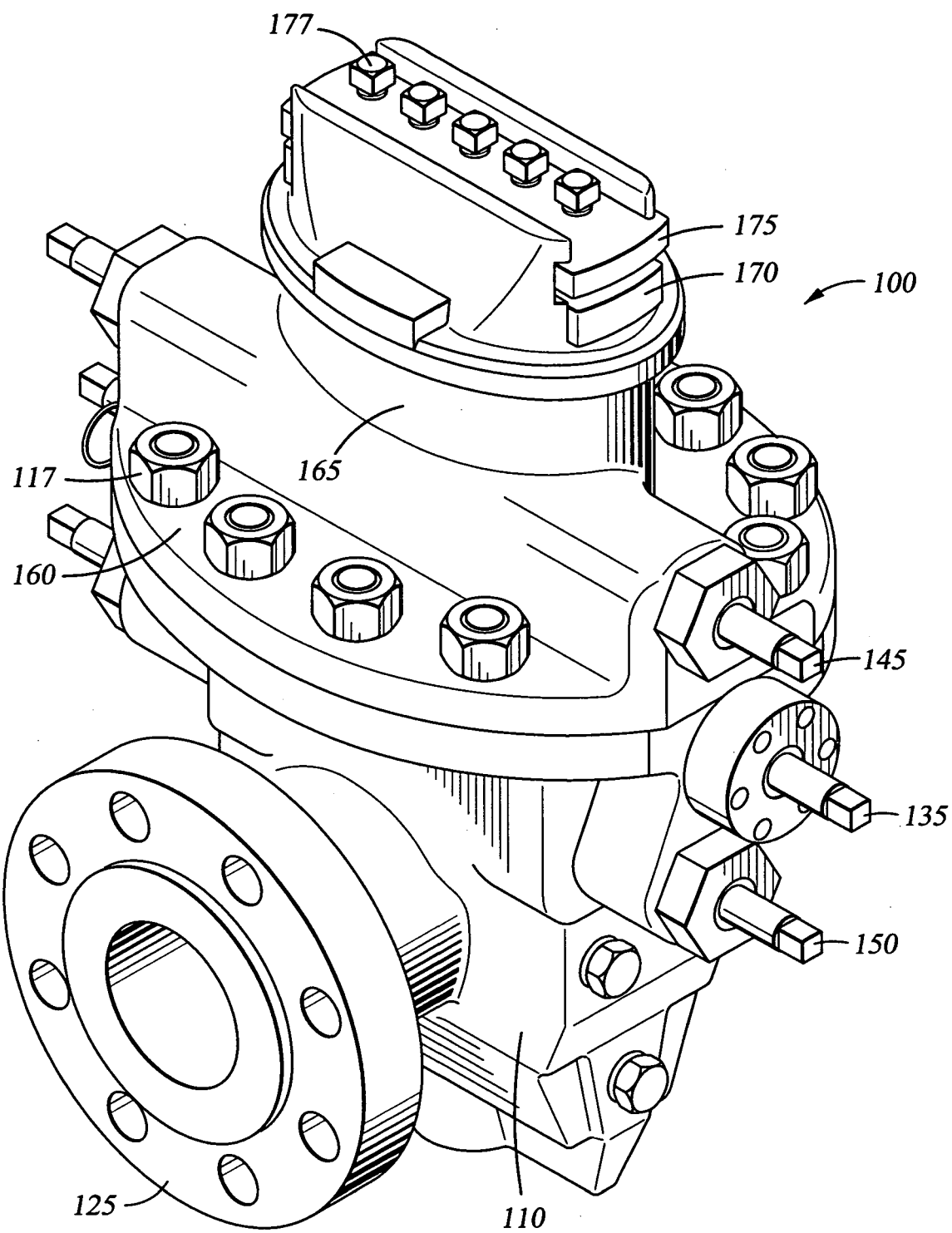
FIG. 2 is an isometric view of a dual chamber orifice fitting having a plug valve.
Figure 3:
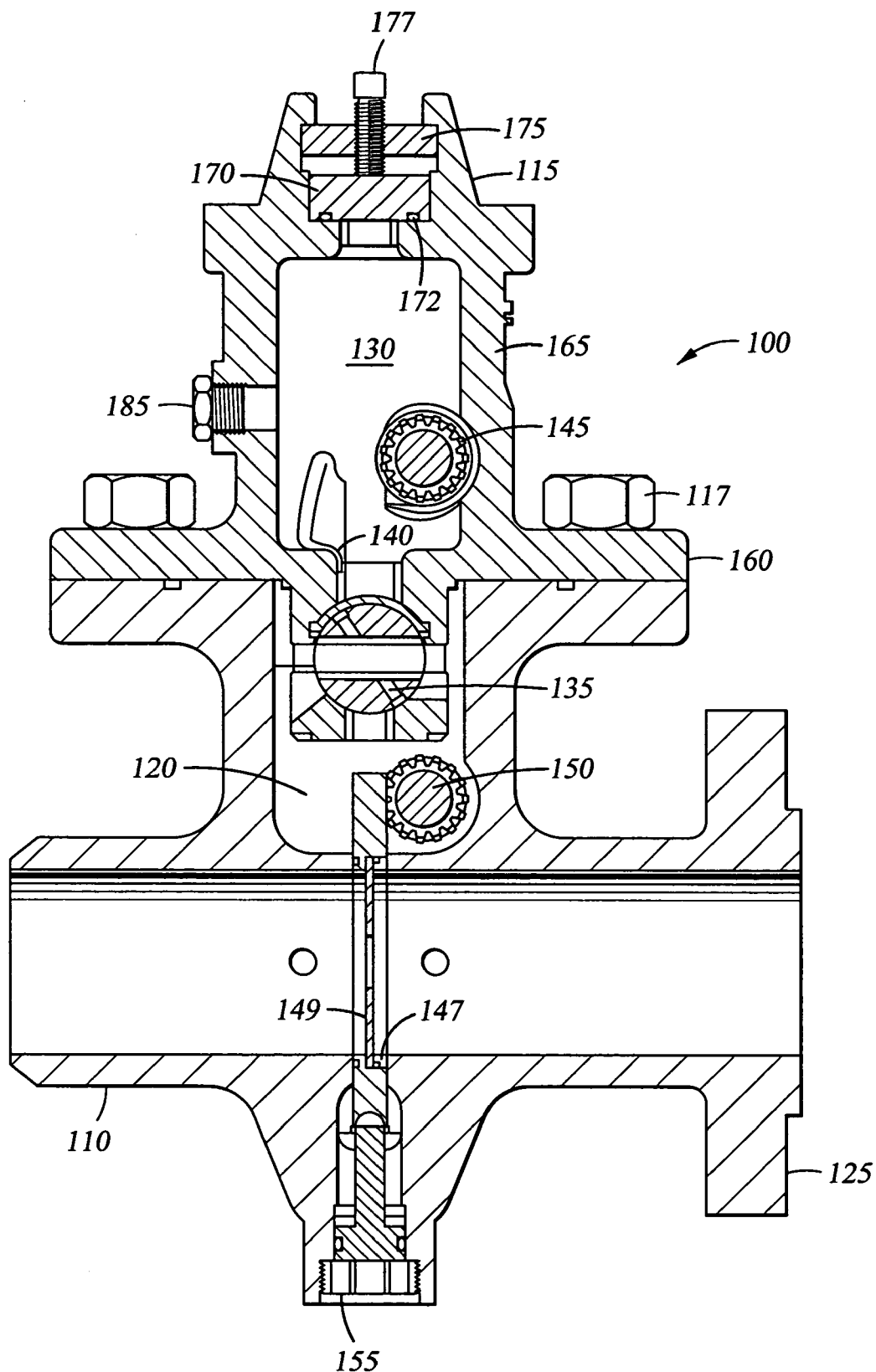
FIG. 3 is a cross-sectional view of the dual chamber orifice fitting of FIG. 2.

Referring now to FIGS. 2 and 3, one embodiment of a dual chamber orifice fitting 100 is shown. Fitting 100 includes body 110 and top 115 connected by bolts 117. Body 110 encloses lower chamber 120 and provides fluid communication with the interior of the pipeline by way of flange 125. Plug 155 seals the lower end of body 110. Top 115 encloses upper chamber 130 and includes aperture 140, which provides a passageway between the upper chamber and lower chamber 120. Top 115 includes flange 160, for connecting with body 110, and wall 165 surrounding upper chamber 130. Upper chamber 130 is isolated from atmospheric pressure by sealing bar 170 and sealing bar gasket 172, which are retained by clamping bar 175 and clamping bar screws 177. Wall 165 supports upper drive assembly 145 and includes port 185, which provides access to upper chamber 130. Preferred configurations of a body and top are described in U.S. patent application Ser. No. 10/848,883, entitled "Dual Chamber Orifice Fitting Body," which is incorporated by reference herein for all purposes.

Orifice plate carrier 147 supports the orifice plate 149. Upper drive assembly 145 and lower drive assembly 150 are used to move orifice plate carrier 147 between lower chamber 120 and upper chamber 130. One preferred orifice plate carrier assembly is described in U.S. patent application Ser. No. 10/849,087, entitled "Dual Chamber Orifice Fitting Plate Support," which is hereby incorporated by reference herein for all purposes.

Figure 4:
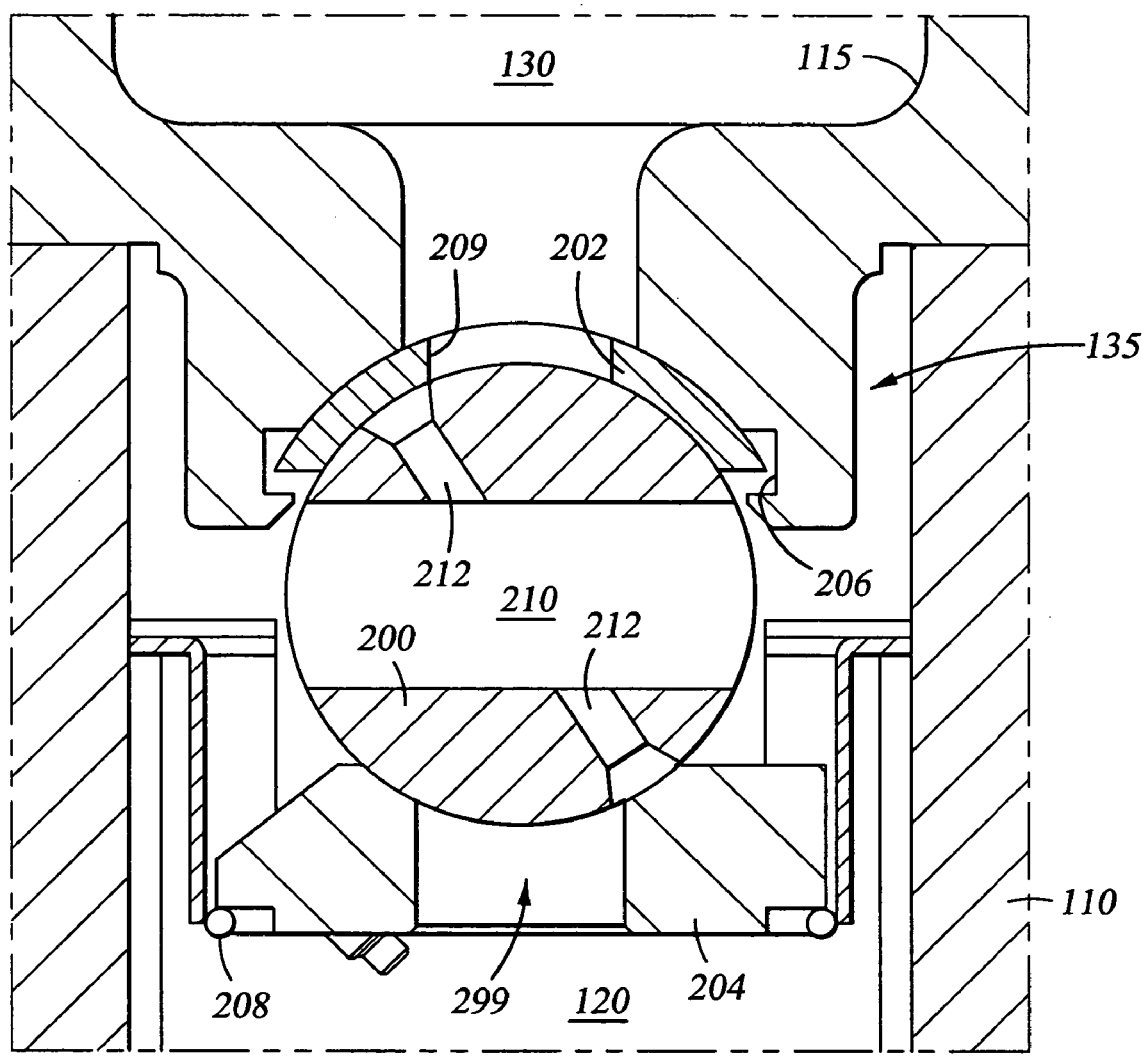
FIG. 4 is a partial cross-sectional view of the plug valve assembly of FIG. 2.

Fluid communication and the movement of orifice plate carrier 140 between upper chamber 130 and lower chamber 120 are regulated by valve assembly 135. Valve assembly 135 is illustrated as a plug valve that utilizes a cylindrical sealing surface that is rotated between and opened and closed position. A cross-sectional view of one embodiment of valve assembly 135 is shown in FIG. 4. Valve assembly 135 includes plug 200, seat 202, and saddle 204. Seat 202 is a curved sealing member having aperture 209. The ends of seat 202 are supported in grooves 206 formed in top 115. Grooves 206 allow for easy assembly and disassembly of seat 202 from top 115. Plug 200 has a substantially cylindrical body including a rectangular, longitudinal aperture 210 and relief port 212. Seat 202 has an inside diameter slightly smaller than the outside diameter of plug 200 in order to promote sealing engagement between the seat and the plug. Plug 200, seat 202 and saddle 204 can be constructed out a variety of materials selected for suitability with a particular working environment, such as alloys, steel, composites, and polymeric materials.

Saddle 204 is disposed within body 110 and may be urged upward against plug 200 by spring 208. In certain embodiments, spring 208 is located between saddle 204 and body 110 in order to bias plug 200 into contact with seat 202. Spring 208 may be a round wire spring formed into a rectangle or other appropriate shape so as to apply a uniform force to saddle 204. Spring 208 preferably provides sufficient force to effectuate a low-pressure seal between plug 200 and seat 202.

As is shown in FIG. 4, plug 200 is in a closed position preventing flow between lower chamber 120 and upper chamber 130. Pressure 299 in lower chamber 120 pushes plug 200 against seat 202. The force generated by pressure 299 seals plug 200 against the lower surface of seat 202 and seals the upper surface of seat 202 against top 115. Plug 200 can be rotated between the closed position, as shown in FIG. 4, to an open position where seat aperture 209 is aligned with plug aperture 210. The aligned apertures-provide a passageway that allows an orifice plate carrier to pass therethrough. Plug 200 also has an equalized position where port 212 provides a pathway for fluid communication between upper chamber 130 and lower chamber 120, but this pathway does not support the movement of an orifice plate carrier.

Figure 5:
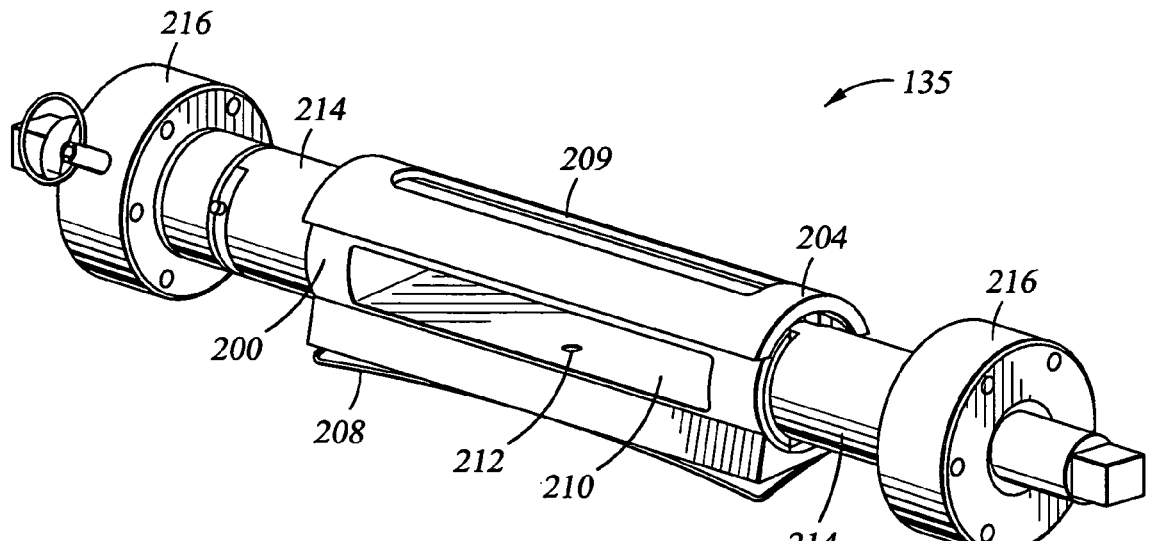
FIG. 5 is an isometric view of the valve assembly of FIG. 4.
Figure 6:
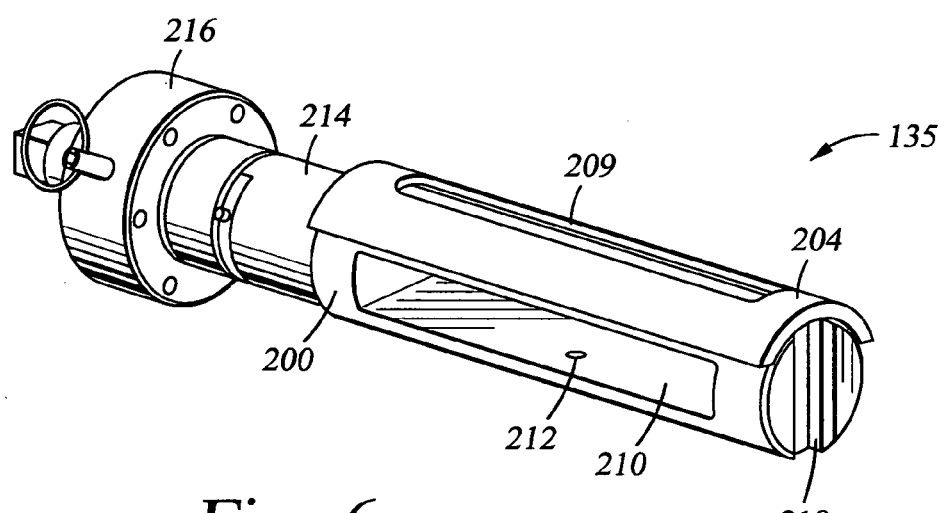
FIG. 6 is an isometric view of select components of the valve assembly of FIG. 4.

Referring now to FIGS. 5 and 6, valve assembly 135 is shown including stems 214 and bonnets 216, which are used to rotate plug 200. FIG. 6 shows valve assembly 135 absent one stem 214 and bonnet 216. Bonnets 216 connect to the fitting body and support stems 214 that interface with slots 218 on the ends of plug 200. Slots 218 are oriented perpendicular to the aperture 210. Slots 218 allow stems 214 to control the angular orientation of plug 200 without constraining the vertical movement of the plug when in the closed position.

Slots 218 allow plug 200 to uniformly engage seat 202 when pressurized from the lower chamber. This uniform engagement allows plug 200 to bear against the seat with a consistent force along the entire contact length. Since the ends of plug 200 are not fixed to stems 214, the plug does not deflect along its length.

Figure 7:
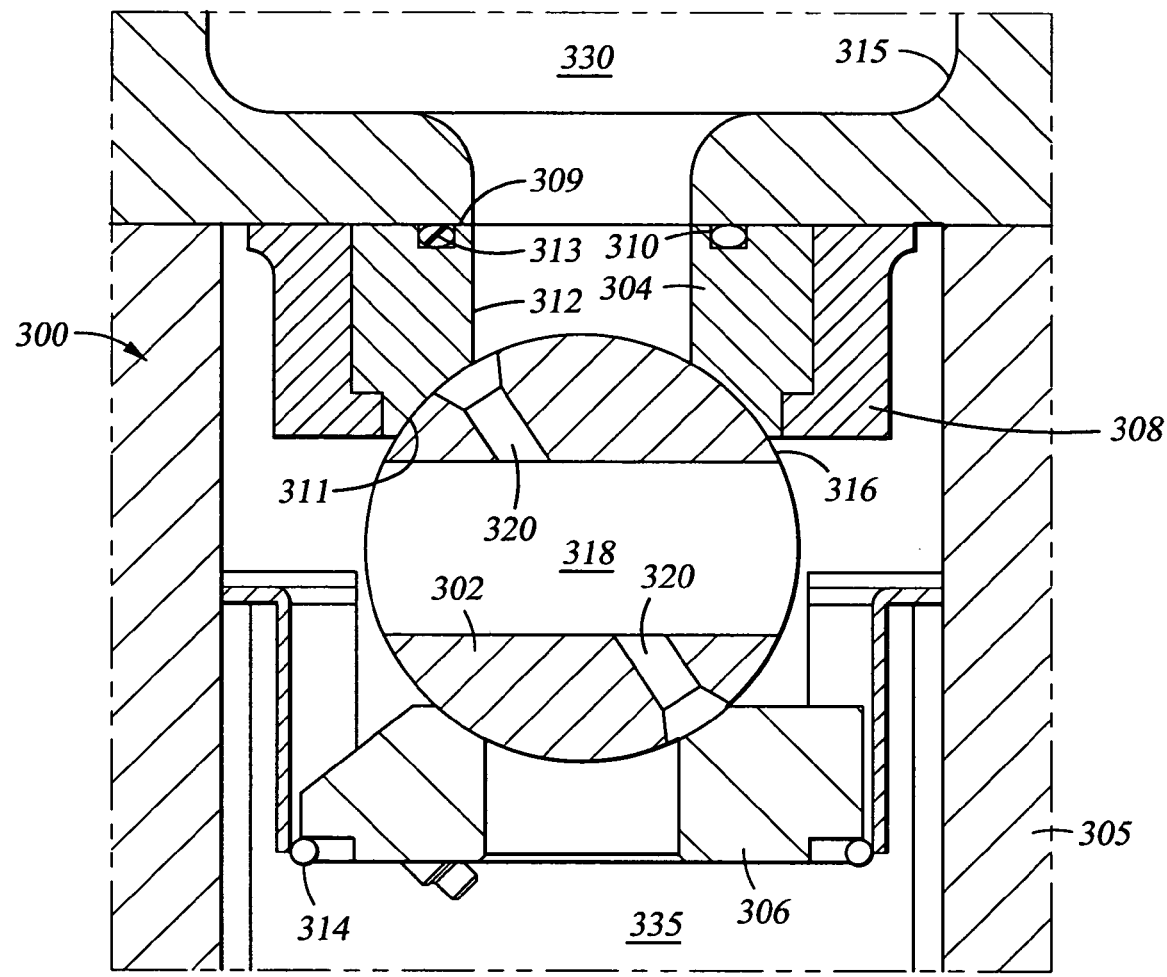
FIG. 7 is a partial cross-sectional view of an alternate embodiment of a plug valve assembly.
Figure 8:
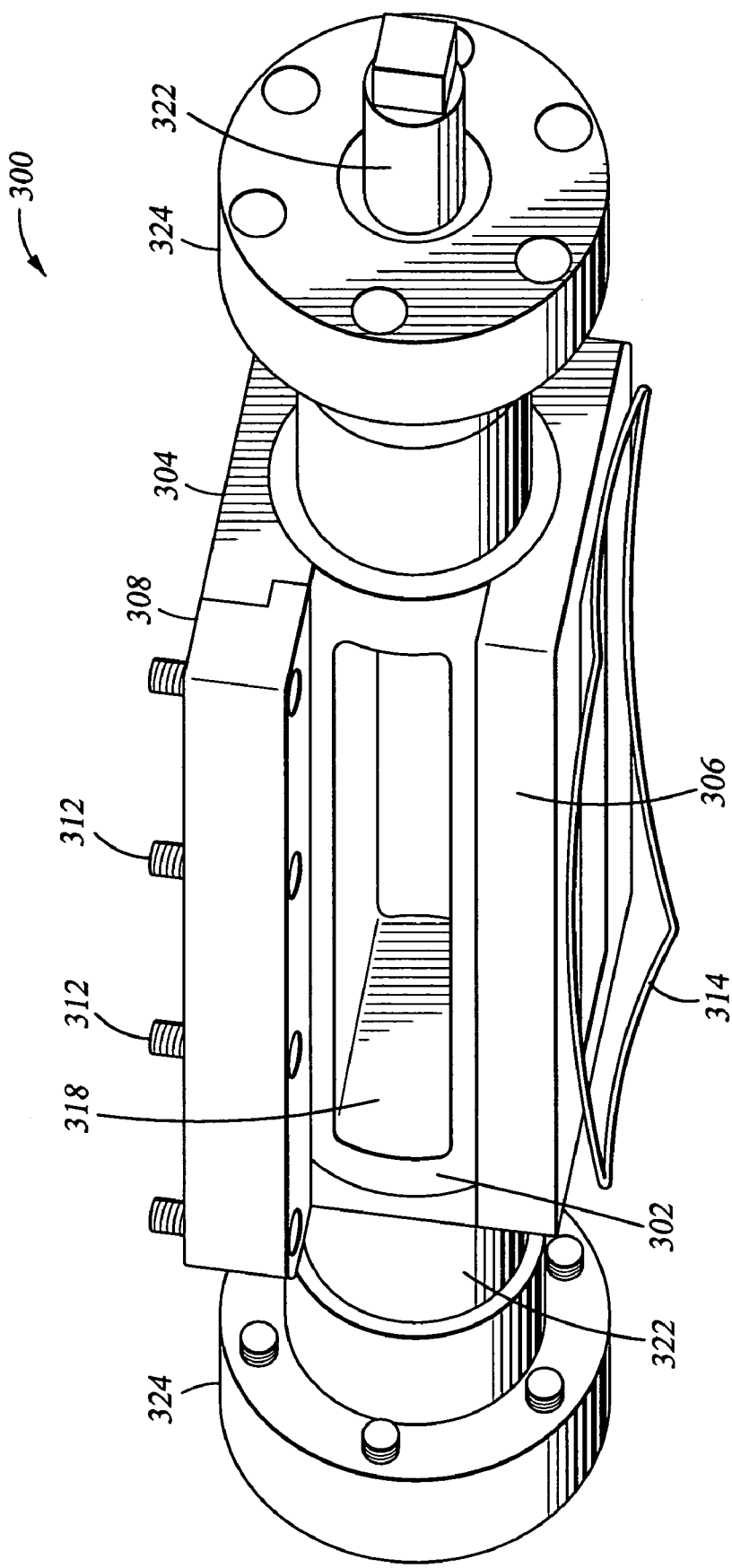
FIG. 8 is an isometric view of the valve assembly of FIG. 7.
Figure 9:
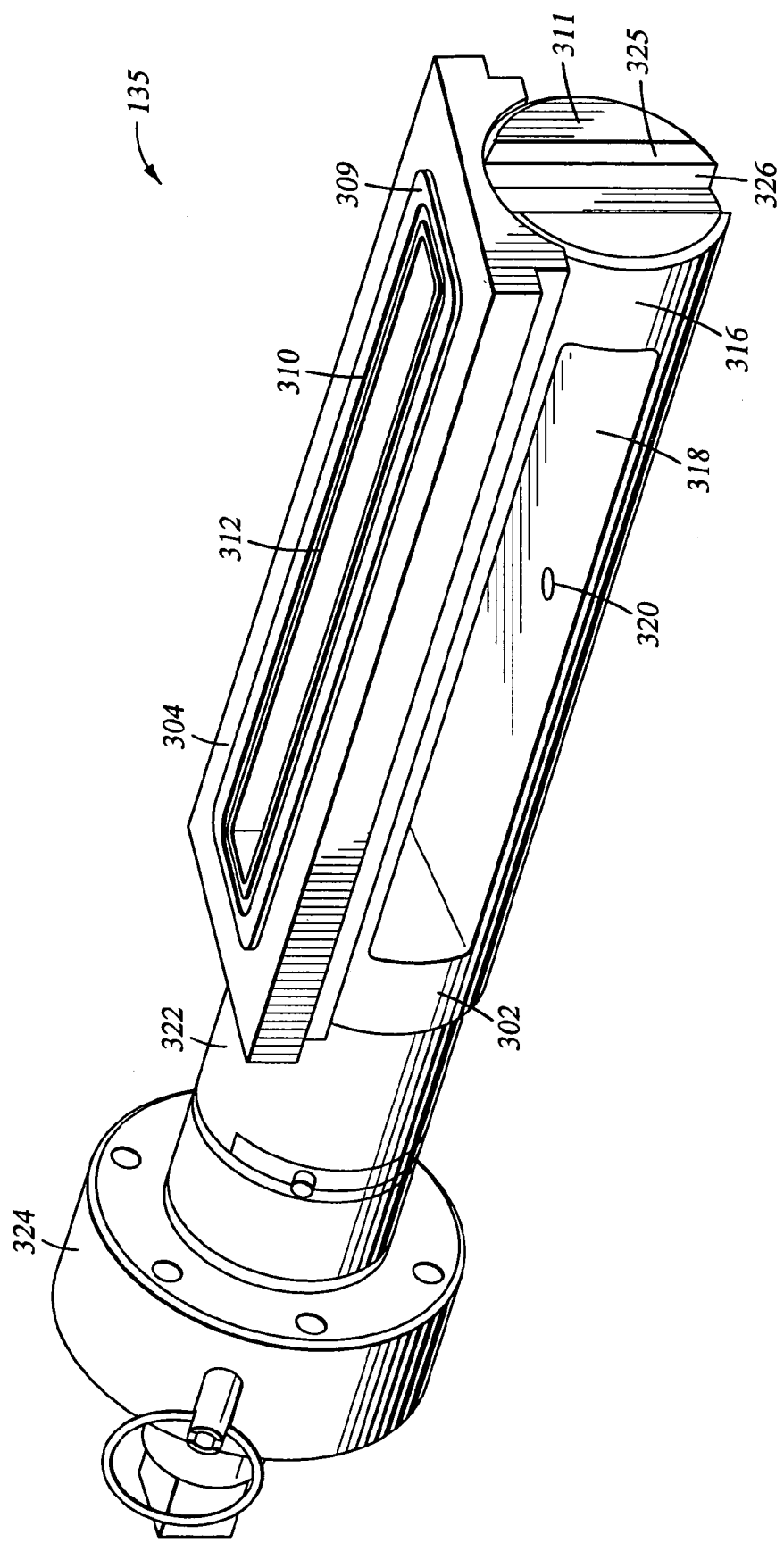
FIG. 9 is an isometric view of select components of the valve assembly of FIG. 7.

Referring now primarily to FIGS. 7–9, an alternative seal assembly 300 is shown including plug 302, seat 304, and saddle 306. Seat carrier 308 connects seat 304 to top 315 while saddle 306 is supported by body 305. Plug 302 is shown in the closed position where the plug seals against seat 304 and prevents fluid communication between upper chamber 330 and lower chamber 335.

Seat 304 is constructed from a polymeric material, such as PEEK™, and has an upper sealing surface 309 and a lower sealing surface 311. Upper sealing surface 309 includes a seal groove 310 and has an aperture 312 sized to allow an orifice plate carrier to pass therethrough. When installed into a fitting assembly, seal groove 310 contains seal element 313, which is compressed and seals against top 315. Seat carrier 308 is connected to top 315 by fasteners 312 and maintains the position of seat 304. Lower sealing surface 311 is curved and provides the sealing surface against which plug 302 seats when the fitting is pressurized. Saddle 306 is located immediately below plug 302 and is mounted to body 305.

In certain embodiments, spring 314 is located between saddle 306 and body 305 in order to bias the plug into contact with seat 304. Spring 314 is preferably a round wire spring formed into a rectangle or other appropriate shape so as to apply a uniform force to saddle 306. Spring 314 preferably provides sufficient force to effectuate a low-pressure seal between plug 302 and seat 304.

Plug 302 has a generally cylindrical outer surface 316. Aperture 318 is formed through plug 302 and sized to allow an orifice plate carrier to pass therethrough. An equalizer port 320 provides a path for fluid communication between aperture 318 and the outside surface of plug 302. Plug 302 is moved between the open and closed position by rotating stem 322 approximately 90 degrees, which rotates plug 302 along its longitudinal axis. Bonnets 324 seal against both stem 322 and body 305 also provide support to maintain the lateral position and rotatability of stems 322 and plug 302.

Each end 325 of plug 302 has a slot 326 perpendicular to the direction of aperture 318. Slot 326 is adapted to interface with stem 322 and allows free vertical movement of plug 302 when the plug is in the closed position. This unrestricted movement allows plug 302 to bear against seat 304 with a uniform force along the entire contact length. Since the ends of plug 302 are not fixed to stems 322, the plug does not deflect along its length and provides a uniform sealing engagement between the plug and seat 304.

Figure 10:
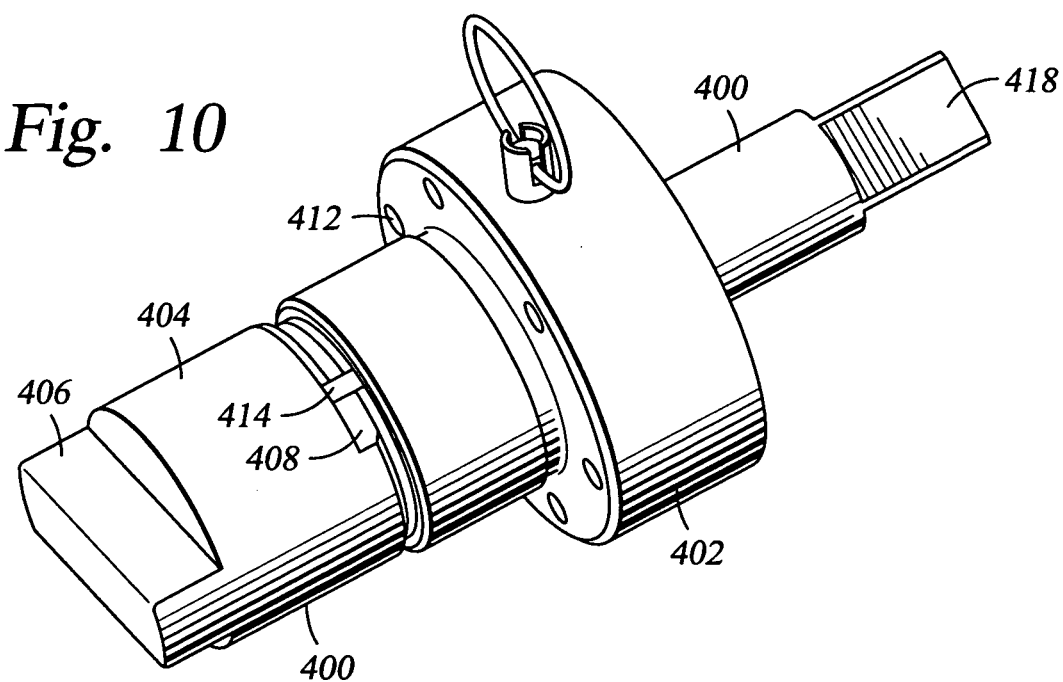
FIG. 10 is an isometric view of one embodiment of a stem and bonnet assembly.

Referring now to FIG. 10, stem 400 and bonnet 402 are shown. The end of stem 400 that engages with slot 218 (FIG. 7) or 326 (FIG. 9) has a boss 404 with a tab 406 on one end and a parallel shoulder 408 on the other. Tab 406 interfaces with the slot on the ends of a plug. Bonnet 402 fits over stem 400 and rests against boss 404. Bonnet 402 has a bolt pattern 412 enabling attachment of the bonnet to body 110. Bonnet 402 also has a pin 414 that engages shoulder 408 and limits the rotational travel of stem 400 to 90 degrees relative to bonnet 402, effectively limiting the rotation of the plug between the open and closed position. Square end 418 of stem 400 provides an attachment location for a handle (not shown) that can be used to rotate the stem either manually or with an automated system.

Figure 11:
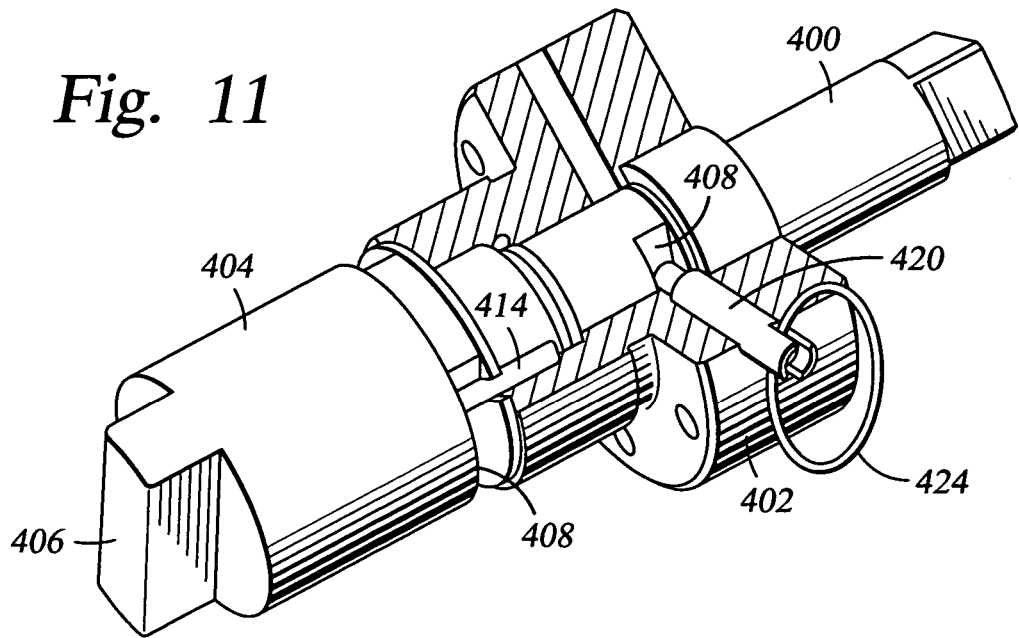
FIG. 11 is a partial sectional isometric view of one embodiment of a stem and bonnet assembly.

Referring now to FIG. 11, bonnet 402 may also have a spring-loaded pin 420. Pin 420 is spring-loaded to the extended position where it engages groove 422 on stem 400 when the plug is in the closed position. Pin 420 is disengaged by pulling ring 424. Groove 422 is sized such that stem 400 is rotationally limited. In certain embodiments, groove 422 is sized such that, with pin 420 engaged, rotational force applied to stem 400 can move the plug the 15 to 30 degrees required to move from the closed position to the equalized position, but pin 420 must be disengaged from groove 422 before rotating stem 400 and the plug the full 90 degrees to the opened position. In effect, pin 420 prevents unintentional movement of the plug from the closed position to the fully opened position.

Figure 12A:
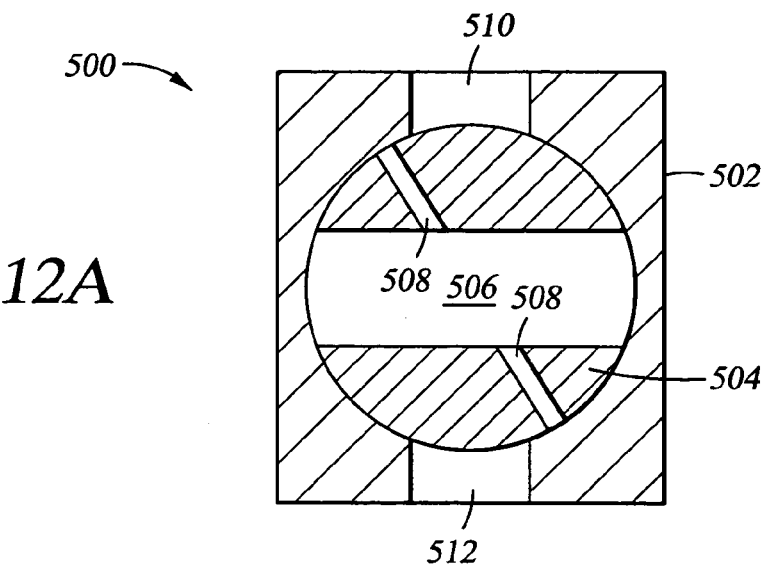
FIG. 12A is a sectional view showing a valve assembly in a closed position.
Figure 12B:
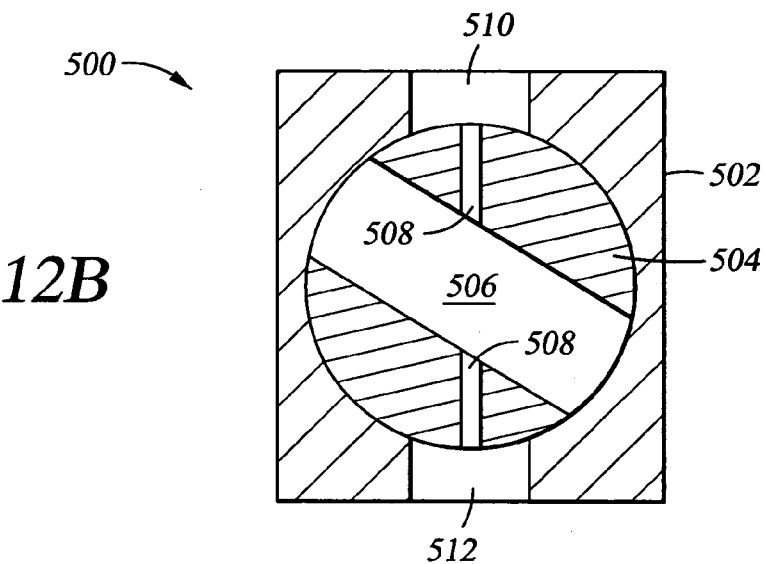
FIG. 12B is a sectional view showing a valve assembly in an equalized position.
Figure 12C:
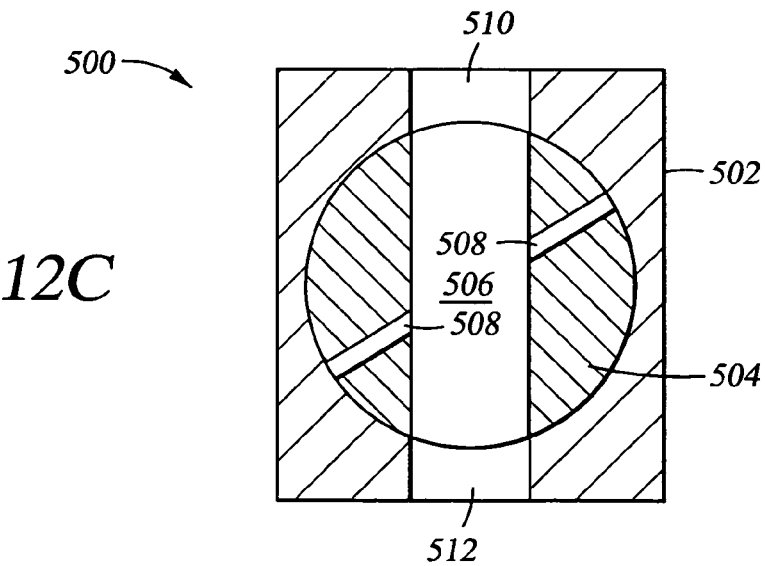
FIG. 12C is a sectional view showing a valve assembly in an open position.

Referring now to FIGS. 12A–12C, the operating positions of a schematic valve assembly 500, including body 502 and rotatable plug 504 with aperture 506 and equalization port 508, are shown. Plug 504 is used to control fluid communication between an upper chamber 510 and lower chamber 512 in body 502. In FIG. 12A, plug 504 is shown in the fully closed position. Pressure from lower chamber 512 pushes plug 504 upward and into body 502 forming a seal that prevents fluid communication between the upper and lower chambers.

FIG. 12B shows plug 504 in an equalized position where the plug has been rotated approximately 15 degrees. With respect to the embodiments described in reference to FIG. 11, this would be the point at which the spring-loaded pin 420 reaches the end of groove 426. In this position, equalizer port 508 opens a fluid pathway between lower chamber 512 and upper chamber 510. Although equalizer port 508 is shown as a single cylindrical penetration, in certain embodi- FIG. 12C shows plug 504 in the fully opened position. Plug 504 has been rotated 90 degrees from the closed position to the limit of travel of pin 414 on shoulder 416 (see FIG. 10). Spring-loaded pin 420 is pulled from groove 426 so that plug 504 can rotate past the equalized position (see FIG. 11). In the opened position, aperture 506 through plug 504 is aligned with upper chamber 510 and lower chamber 512 so that the orifice plate carrier (not shown) can pass freely between the chambers.

The equalized position provides for an intermediate position between the closed and opened positions where pressure is allowed to equalize between the upper chamber 510 and lower chamber 512. For example, when a dual chamber orifice fitting is being taken out of service, lower chamber 512, being in fluid communication with a pipeline, may be at a high pressure. In contrast, upper chamber 510 may be at a much lower pressure. The equalized position allows this pressure to be equalized before the aperture between the upper and lower chambers is opened completely.

The plug valve arrangements described herein are capable of operating in less space than the slide valve arrangement shown in FIG. 1. This allows for smaller, lighter weight, and more compact dual chamber orifice fitting assemblies. The plug valve arrangement also provides a valve that is fully actuated with only 90 degrees of rotation. This provides significant advantages over a sliding valve that may need several full 360 degree rotations of a drive shaft to fully actuate. Not only does the plug valve operate quicker, but the limited rotation simplifies the automation of the actuation of the valve.

The fully cylindrical plug also provides a more reliable sealing engagement capable of withstanding higher pressures and more extreme working environments. The fully cylindrical plug is resistant to bending stresses created by pressure differentials across the plug. Because the ends of the plug are also allowed to move vertically when in the closed position, the stress is further reduced in the plug in comparison to an arrangement where the ends of the plug were vertically fixed.

The preferred embodiments of the present invention relate to apparatus for hydraulically isolating the two interior chambers of a dual chamber orifice fitting. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. In particular, various embodiments of the present invention provide a number of different valve shapes and styles to improve operation of the fitting. Reference is made to the application of the concepts of the present invention to dual chamber orifice fitting with a plate orifice, but the use of the concepts of the present invention is not limited to these applications, and can be used for any other applications including other dual chamber fittings and orifice fittings. It is to be fully recognized that the different teachings of the embodiments discussed below may be employed separately or in any suitable combination to produce desired results.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A valve assembly for a dual chamber orifice fitting comprising:
    an orifice plate carrier;
    a seat having a seat aperture;
    a plug having a plug aperture and curved outer surface, wherein said plug has a closed position prohibiting fluid communication across said plug, an open position, wherein the plug aperture is aligned with the seat aperture, so that said orifice plate carrier is movable through the plug aperture between an upper and lower chamber of the dual chamber orifice fitting, and an equalized position, wherein the plug aperture is not aligned with the seat aperture and fluid communication is permitted across said plug between an upper and lower chamber of the dual chamber orifice fitting; and
    a stem coupled to an end of said plug and adapted to rotate said plug between the closed position and the open position.

2. The valve assembly of claim 1 wherein in the closed position said plug is adapted to move relative to said stem.

3. The valve assembly of claim 2 further comprising a slot on an end of said plug, wherein said slot is arranged perpendicular to the plug aperture and is engaged with said stem.

4. The valve assembly of claim 1 further comprising one or more equalizer ports connecting said plug aperture to the curved outer surface of said plug, wherein in the equalized position where fluid communication across said plug is permitted through said one or more equalizer ports.

5. The valve assembly of claim 1 further comprising a bonnet connected to the dual chamber orifice fitting, wherein said bonnet is operable to support said stem.

6. The valve assembly of claim 5 further comprising:
    a circumferential groove on said stem; and
    a pin moveably connected to said bonnet, wherein said pin is operable to engage said groove.

7. The valve assembly of claim 6 wherein said pin engages said groove in the closed and equalized positions but does not engage said groove in the open position.

8. The valve assembly of claim 1 further comprising a saddle adapted to engage said plug in a position opposite said seat.

9. The valve assembly of claim 8 wherein said saddle biases said plug against said seat.

10. The valve assembly of claim 1 wherein said plug is rotated approximately 15 degrees between the closed position and the equalized position.

11. The valve assembly of claim 1 wherein said plug is rotated approximately 90 degrees between the closed position and the open position.

12. A dual chamber orifice fitting comprising:
    a body having a lower chamber in fluid communication with a pipeline;
    a top attached to said body, wherein said top has an upper chamber;
    a passageway between the upper and lower chambers;

an orifice plate carrier moveably disposable through said passageway between the upper chamber and the lower chamber;

a valve seat having a seat aperture therethrough, wherein the seat aperture is substantially aligned with said passageway;

a rotatable plug having a plug aperture therethrough, said rotatable plug having a cylindrical outer surface operable to sealingly engage said valve seat when said rotatable plug is in a closed position; and a stem connected to said plug and operable to rotate said plug from the closed position to an open position wherein the plug aperture is aligned with the seat aperture and the passageway so that said plate carrier is movable through the plug aperture between the upper and lower chambers.

13. The dual chamber orifice fining of claim 12 wherein the orifice plate carrier can move through said passageway when said rotatable plug is in the open position.

14. The dual chamber orifice fitting of claim 12 further comprising one or more equalizer ports through said rotatable plug at an angle to the plug aperture, wherein said rotatable plug has an equalized position wherein the plug aperture is not aligned with the seat aperture and fluid communication through said passageway is permitted through said equalizer port.

15. The valve assembly of claim 14 wherein said rotatable plug is rotated approximately 15 degrees between the closed position and the equalized position.

16. The valve assembly of claim 12 wherein said rotatable plug is rotated approximately 90 degrees between the closed position and the open position.

17. The dual chamber orifice fining of claim 12 further comprising a bonnet connected to said body and operable to support said stem.

18. The dual chamber orifice fitting of claim 17 further comprising:
 a circumferential groove on said stem; and
 a pin moveably connected to said bonnet, wherein said pin is operable to engage said groove.

19. The dual chamber orifice fitting of claim 18 wherein said pin engages said groove in the closed and equalized positions but does not engage said groove in the open position.

20. The dual chamber orifice fitting of claim 12 further comprising a saddle supported by said body and having a curved surface operable to engage a portion of the cylindrical outer surface of said rotatable plug opposite said valve seat.

21. The dual chamber orifice fitting of claim 20 wherein said saddle biases said rotatable plug against said valve seat.

22. The dual chamber orifice fitting of claim 21 further comprising a spring disposed between said body and said saddle, wherein said spring is operable to bias said plug against said seat.

23. A method for operating a dual chamber orifice fitting, the method comprising:
 rotating a valve assembly from a first position isolating a first chamber of the fitting from a second chamber of the fitting to a second position to expose a first aperture allowing fluid communication between the chambers;
 allowing fluid flow between the chambers;
 rotating the valve assembly to an third position to place a second aperture in fluid communication with the first and second chambers;
 actuating a drive mechanism to move an orifice plate carrier between the chambers by passing though the second aperture; and
 rotating the valve assembly back to the first position.

24. The method of claim 23 further comprising maintaining the second position until pressure is equal in the first and second chambers.

25. The method of claim 23 wherein the valve assembly comprises:
 a valve seat attached to the fitting;
 a plug adapted to engage the valve seat;
 a stem adapted to rotate the plug, wherein the plug is adapted to move relative to the stem; and
 a bonnet attached to the fitting and supporting the stem.

26. The method of claim 25 wherein a pin attached to the bonnet engages a slot on the stem as the valve assembly is moved from the first position to the second position.

27. The method of claim 26 further comprising removing the pin from the slot before rotating the valve assembly to the third position.

* * * * *